United States Patent [19]

Fenart

[11] 4,211,315

[45] Jul. 8, 1980

[54] COVER ASSEMBLY FOR A DIAPHRAGM SPRING CLUTCH HAVING DIAPHRAGM SPRING CENTERING MEANS INDEPENDENT AND DISTINCT FROM ASSEMBLY MEANS THEREFOR

[75] Inventor: Jean-Claude Fénart, Fourqueux, France

[73] Assignee: Societe Anonyme Francaise du Ferodo, Paris, France

[21] Appl. No.: 847,599

[22] Filed: Nov. 1, 1977

[30] Foreign Application Priority Data

Nov. 12, 1976 [FR] France ................................ 76 34089

[51] Int. Cl.² ............................................. F16D 13/71
[52] U.S. Cl. ................................ 192/70.27; 192/89 B
[58] Field of Search ................ 192/89 B, 70.27, 70.29, 192/70.3

[56] References Cited

U.S. PATENT DOCUMENTS

| | | | |
|---|---|---|---|
| 2,222,508 | 7/1939 | Hunt | 192/70.27 |
| 3,595,355 | 7/1971 | Maucher | 192/89 B |
| 3,939,951 | 2/1976 | Sink et al. | 192/89 B |
| 4,039,059 | 8/1977 | de Gennes | 192/89 B |

FOREIGN PATENT DOCUMENTS 1229678  4/1971  United Kingdom ................... 192/89 B Primary Examiner—Allan D. Herrmann
Attorney, Agent, or Firm—Charles E. Brown

[57] ABSTRACT

A diaphragm spring clutch in which the diaphragm spring is secured to the cover member by posts, or a clip ring. Centering studs distinct and independent of the posts or clip ring are carried by the cover member for centering the diaphragm spring on the cover member. Enlarged passages are provided at the radial inner ends of slots between consecutive finger portions of the diaphragm spring, the enlarged passages being of oblong configuration with opposed radial sides, and the centering studs being in contact with portions of the edge defining the enlarged passages.

7 Claims, 6 Drawing Figures

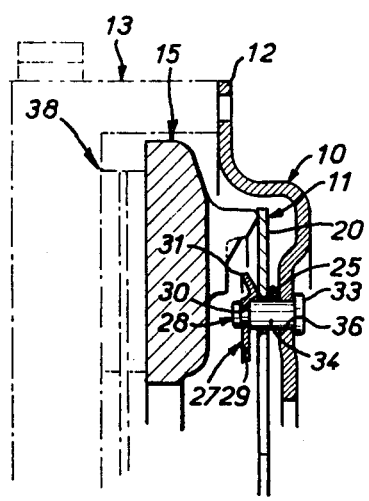
FIG.3
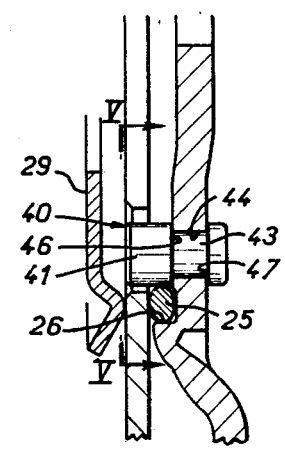
FIG.4
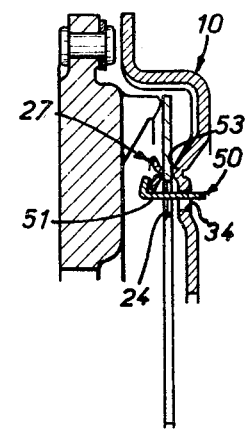
FIG.6
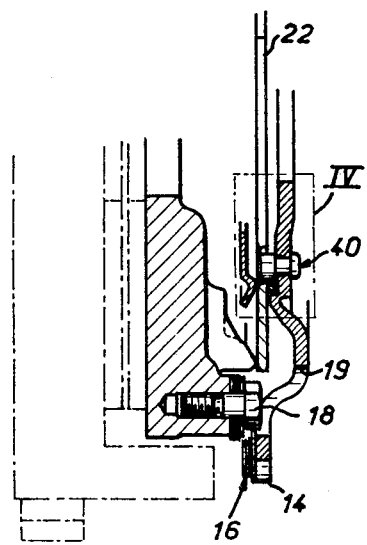
FIG.5
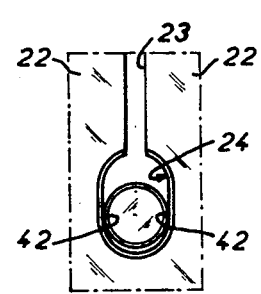
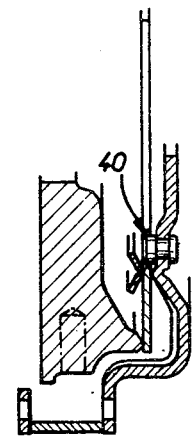

COVER ASSEMBLY FOR A DIAPHRAGM SPRING CLUTCH HAVING DIAPHRAGM SPRING CENTERING MEANS INDEPENDENT AND DISTINCT FROM ASSEMBLY MEANS THEREFOR

FIELD OF THE INVENTION

The present invention relates generally to diaphragm spring clutches and their cover assemblies and more particularly to the assembly and centering of the diaphragm spring on the cover member.

The present invention relates to such diaphragm spring clutches which comprise a flywheel or reaction plate adapted to be fixed to a first shaft, usually the driving shaft, a friction disc mounted for axial movement with respect to the flywheel and adapted to be fixed to a second shaft, usually the driven shaft, a pressure plate mounted for axial movement with respect to the flywheel, a generally annular cover member adapted to be secured along its outer periphery to the flywheel and fixed for rotation therewith, an annular diaphragm spring including a peripheral frustoconical or Belleville washer portion for coacting with said pressure plate, and a central portion divided into radial fingers for coacting with a movable thrust member or clutch release bearing and assembly means for securing the diaphragm spring to said cover member so as to permit rocking movement thereon.

BACKGROUND OF THE INVENTION

In friction clutch constructions of this type, usually the cover assembly comprising the cover member and the diaphragm spring borne thereby is assembled alone and then the pressure plate is added by assembly means which are previously fixed to the pressure plate and adapted to join the cover member, and then, after introducing the friction disc the resultant assembly is fixed to the flywheel or reaction plate.

The present invention is more particularly concerned with the cover assembly formed by the cover member of the diaphragm clutch and the diaphragm spring borne thereby, irrespective of whether the pressure plate has already been secured thereto, yet it is also concerned with the entire diaphragm spring clutch as well irrespective of the fact that the cover assembly is or is not assembled as an entirety or as components beforehand.

In such diaphragm spring clutches it is necessary to properly center the diaphragm spring with respect to the axis of the clutch or cover assembly.

To this end it is common to make use of assembly means which rockably mount the diaphragm spring on the cover member.

Indeed, the assembly means, whether they are in the form of individual posts or in the form of an annular clip ring or even if they are integrally formed with the cover member itself, all comprise, in succession, an anchoring portion by which they bear on the cover member, an axial portion passing through passages defined by spaces between consecutive radial fingers of the diaphragm spring at the radially inner, junction zone thereof, and an end portion located beyond the diaphragm spring by which they bear on the side of the diaphragm spring remote from the cover member, either directly or indirectly by means of two ring members one of which may be integrally formed with the cover member being provided between the cover member and the side of the diaphragm spring facing the same.

In passing through the diaphragm spring the assembly means usually bear against the edges defining the passages so as to insure centering.

But when the friction clutch is in operation, under the resilient force developed by the diaphragm spring axially against the cover member, the cover member is inevitably subjected to bending forces in the zone bearing the diaphragm spring which is precisely where the assembly means for rockably mounting the diaphragm spring to the cover member are situated.

Consequently the axial portions of the assembly means, particularly their end portions, are in the course of operation subjected to "coning" movements which are less controlled because, for the convenience of mounting, the assembly means are merely received in openings in the cover member at their anchoring portion, without being rigidly secured thereto.

Coupled with these coning movements of the assembly means are shifting movements due to acyclic movements emanating from the motor with which the cluch is associated.

The result of these different movements is not only premature wear of the parts involved, but also an uncentering of the diaphragm which causes it to operate under adverse conditions and has an unbalancing effect on the assembly means which secure the diaphragm spring to the cover member for rocking movement thereby augmenting the fatigue of these parts.

It has, of course been proposed, in order to eliminate the play of the assembly means securing the diaphragm spring to the cover member for rocking mounting to rigidly secure the assembly means to the cover member and thereby provide permanent centering of the diaphragm spring.

But experience has shown that unless the assembly means are of appreciable mass which for practical reasons is prohibitive, they are incapable of withstanding the stressing they are subjected to, owing to the different forces exerted thereon as briefly described above, and they yield or break when they serve to secure both the ring member between the cover member and the assembly means for the diaphragm spring on the side of the diaphragm spring opposite the cover member.

SUMMARY OF THE INVENTION

It is a general object of the present invention to provide means of insuring the permanent centering of the diaphragm spring which are simple and efficacious.

According to the invention separate and distinct means are provided for each of the centering and securement functions.

According to the invention centering means are carried by the cover member.

According to a more specific object of the present invention there is provided a cover assembly for a diaphragm spring.

According to a further aspect of the invention a diaphragm spring clutch is provided with such a cover assembly, whether or not the cover assembly is secured thereto.

According to a first preferred emodiment the centering means which are borne by the cover member comprise, for example, rivetlike studs.

It is advantageous to separate the functions of centering of the diaphragm spring and securing it for rocking mounting on the cover member; the means employed therefore are thus distinct and independent, whereby the means insuring the centering function may, without danger of yielding or breaking, be rigidly secured to the cover member which bears them and therefore protected from that play liable to make securement unreliable.

These means are thus capable of permanently insuring in an appropriate manner the centering function.

The features and advantages of the invention will be brought out in the following description, given by way of example, with reference to the accompanying diagrammatic drawings.

BRIEF DESCRIPTION OF THE DRAWINGS

FIG. 3 is an axial cross-sectional view taken along the broken line III—III in FIG. 1;

FIG. 4 is an enlarged fragmentary view of the insert labeled IV in FIG. 3;

FIG. 5 is a partial view in elevation taken along line V—V in FIG. 4; and

FIG. 6 is a view similar to that of FIG. 3 for an alternative embodiment of the invention.

DETAILED DESCRIPTION OF THE PREFERRED EMODIMENTS

Figure 1:
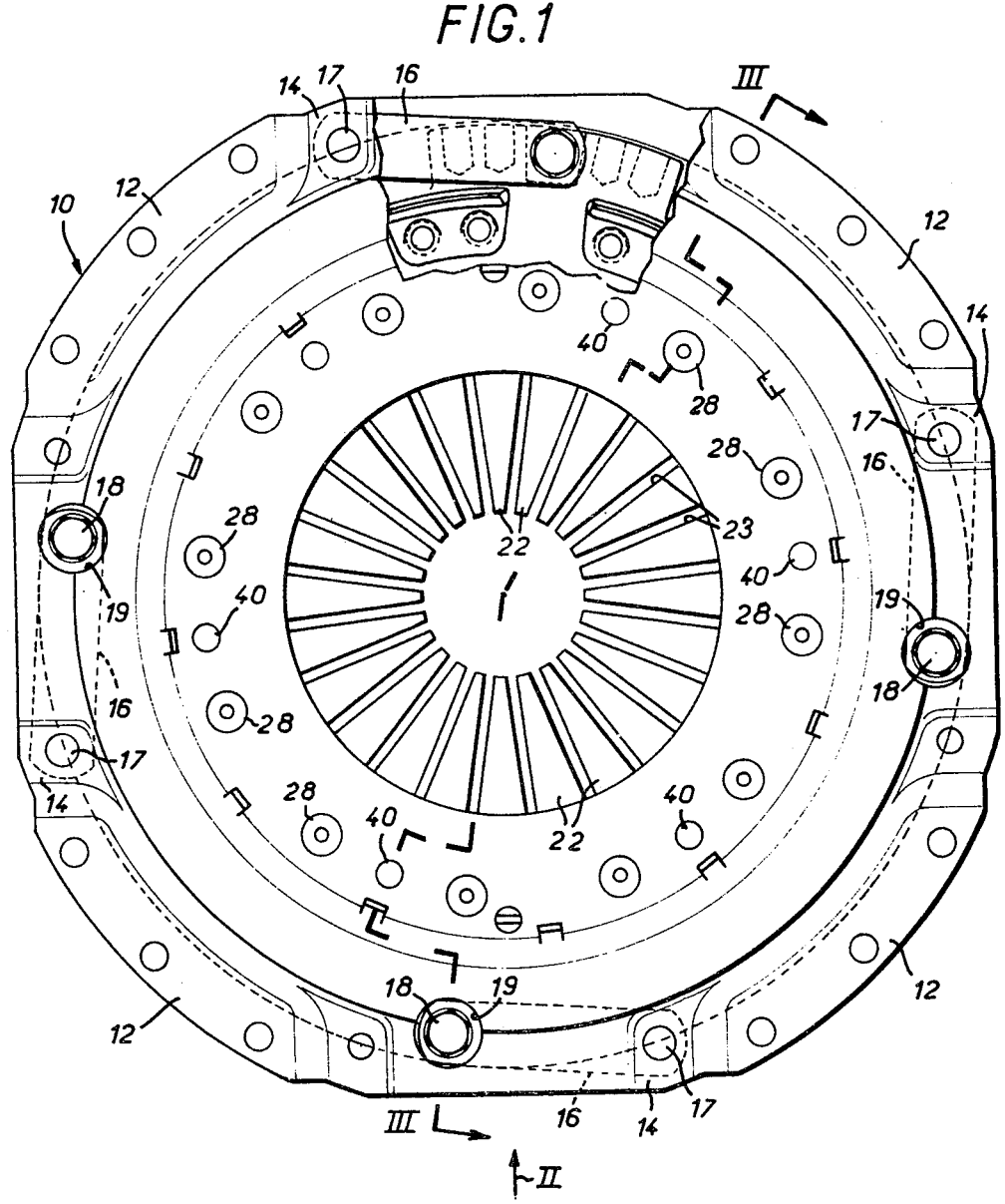
FIG. 1 is an elevation view, broken away in parts, of a cover assembly for a diaphragm spring clutch, according to the invention.

As illustrated in the drawings the unitary cover assembly for a diaphragm spring friction clutch, according to the invention, generally comprises a first generally annular member 10, known as the cover member, and a second generally annular member 11, known as the diaphragm spring.

At the periphery of the cover member 10 are provided a first series of coplanar regions 12 by which the cover member is adapted to be fixed to a first plate member 13, known as the reaction plate or flywheel and depicted diagrammatically in FIG. 3 in phantom lines, and a second series of coplanar regions 14 axially offset with respect to the first series of coplanar regions, by which the cover member 10 is adapted to be secured to a second plate member 15, known as the pressure plate.

In the first illustrated embodiment the unitary cover assembly comprises such a pressure plate 15 and straps 16 connecting the cover member 10 to the pressure plate 15. One of the ends of the straps 16 is riveted to the coplanar regions 14 on the cover member 10 by means of rivets 17 and their other ends are united to the pressure plate 15 by means of screws 18 opposite openings in the cover member 10 provided to receive the screws 18.

The diaphragm spring 11 comprises an outer annular peripheral portion 20 which is formed as a resilient frustoconical or Belleville washer portion which bears against the pressure plate 15. In addition, the diaphragm spring comprises a central portion divided into radial fingers 22 spaced from one another by radial slots 23, the slots 23 terminating in enlarged, radially oriented oblong passages 24 at their closed, radially outer ends, as best seen in FIG. 5.

Assembly means are provided for securing the diaphragm spring 11 to the cover member 10 for rocking movements thereon.

Figure 2:
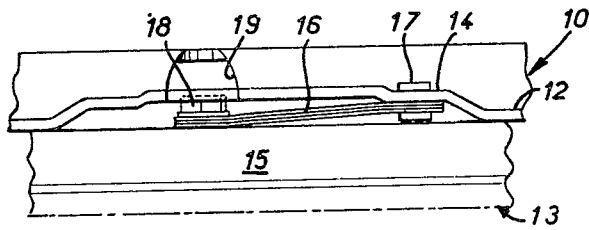
FIG. 2 is a fragmentary side view, taken in the direction of arrow II in FIG. 1.

In the illustrated embodiment of FIGS. 1–5, the assembly means comprises a first ring member 25, shaped like a flattened O-ring, interposed between the diaphragm spring 11 and the cover member 10 and centered relative to the axis of the cover assembly by means of an annular shoulder 26 formed in the cover member 10, e.g., by stamping, and a second ring member or annulus 27 which is disposed on the side of the diaphragm spring 11 remote from the cover member 10 and attached thereto by posts 28.

In the illustrated embodiment, the annulus 27 has an inner zone 29 apertured with passages 30 for the posts 28 and an outer zone 31, V-shaped in section, which bears against the diaphragm spring 11 directly opposite the first ring member 25.

In this illustrated embodiment each post 28 has a head 33 which bears, against the cover member 10, on the side facing away from the diaphragm spring 11 and a stem or shank portion 34 which is simply received in the opening 36 formed in the cover member 10 for this reason, and beyond this, each post successively traverses a passage 24 in the diaphragm spring 11 and a hole 30 in the annulus 27. Preferably the post 28 is simply riveted over beyond the annulus 27.

The straps 14, fixing the pressure plate 15 for rotation with the cover member 10, allows a sufficient degree of mobility of the pressure plate that, under the spring force of the diaphragm spring 11 which bears against the cover member 10 by the first ring member 25, it may clamp a friction disc 38 which is interposed between the pressure plate 15 and the flywheel 13 while at the same time remain relatively axially movable, as schematically illustrated in phantom lines in FIG. 3.

Customarily at the radially inner ends of the radial fingers 22 of the diaphragm spring 11 there is provided a release bearing or movable thrust member (non illustrated) which is adapted to control the release of the friction disc by the pressure plate 15.

The various features are well known per se and therefore need not be described in greater detail herein.

The centering means are provided according to the invention for insuring the centering of the diaphragm spring 11 with respect to the axis of the cover assembly, the centering means are independent and distinct from the assembly means for securing and rockably mounting the diaphragm spring 11 on the cover member 10.

In the illustrated embodiment of FIGS. 1–5, the centering means comprise a plurality of centering studs 40 carried by the cover member 10 and extending parallel to the axis of the cover assembly, which centering studs bear along their sidewalls against the diaphragm spring 11.

More precisely, in the embodiment of FIGS. 1–5 each of the centering studs 40 comprises a head 41 which is received in the passage 24 in the diaphragm spring 11 and bears laterally and therefore circumferentially against at least one part of the edges 42 defining the passages which extend substantially radially of the axis of the cover assembly, and a stem or shank 43 which is received in the hole 44 formed in the cover member 10 by which it is rigidly secured thereto. Each centering stud 40 is positioned immediately adjacent the radially inner end of its respective passage 24 to limit radial movement of the diaphragm spring 11 and thus the centering stud 40 serves to center the diaphragm spring on the cover member 10.

In the illustrated embodiment, the shank 43 of the centering stud 40 is simply riveted over against the cover member 10; however, it may, of course, comprise a threaded extension in threaded engagement with a nut.

In any event each such centering stud 40 comprises two shoulders 46, 47 which face each other by which it clamps the opposed surfaces of the cover member 10 and is therefore rigidly secured thereto.

Of course three such centering studs 40 are sufficient to efficaciously insure permanent centering of the diaphragm spring 11 relative to the axis of the cover assembly.

FIG. 6 depicts an embodiment of the invention where the assembly means for securing the diaphragm spring 11 to the cover member for rocking mounting comprises two annular clip ring segments 50 the clips of which successively transverse holes 34 in the cover member and passages 24 in the diaphragm spring 11 and then extend beyond the annulars 27 where they are bent over radially against the annulus. In the illustrated alternative embodiment the annulus 27 is limited to the portion of V-shaped section. On the other side of the diaphragm spring 11 an annular bearing ridge 53 in place of a ring member is bent or stamped in the cover member 10 to support the diaphragm spring.

According to this embodiment of the invention annular clip ring segments alternate with centering studs 40 of the type described above.

According to a further embodiment, not illustrated, these annular clip ring segments are replaced by tabs or projections formed integrally with the cover 10 in a manner known per se.

It will be realized that in each of the foregoing embodiments the centering studs or members are carried by the cover member 10.

The present invention is not intended to be limited to the various described and illustrated embodiments but emcompasses generally all modifications, alternatives and equivalents with the scope of the appended claims.

What is claimed is:

1. A cover assembly for a diaphragm spring clutch comprising a diaphragm spring including an outer Belleville washerlike peripheral portion and a central portion having radial fingers, and an annular cover member assembly means for rockably mounting the diaphragm spring on said cover member, and a plurality of centering studs for radially centering the diaphragm spring with respect to the axis of the cover assembly, a corresponding plurality of apertures in said diaphragm spring; said centering studs being independent and distinct from said assembly means, rigidly fixed to said cover member, and extending from said cover member parallel to the axis of the cover member assembly into said corresponding plurality of said diaphragm spring apertures.

2. An assembly according to claim 1, in which said centering studs are clamped solely to said cover member and pass through said diaphragm spring apertures transmitting minimal additional axial load to said cover member during operation.

3. In a diaphragm spring clutch including an annular cover member adapted to be secured at its periphery to a flywheel or reaction plate and fixed for rotation with a pressure plate, a diaphragm spring including a Belleville washerlike peripheral portion and a central portion having radial fingers adapted to coact with a release bearing for rocking said diaphragm spring, assembly means for rockably mounting said diaphragm spring on said cover member; wherein the improvement comprises: centering means for centering the diaphragm spring with respect to the axis of the clutch, said centering means being independent and distinct from said assembly means and comprising a plurality of centering studs extending parallel to the axis of the clutch, a corresponding plurality of apertures in said diaphragm spring, said centering studs being in line contact with portions of edges of said diaphragm spring defining said apertures and rigidly fixed to and protruding from said cover member.

4. An assembly according to claim 3, wherein each said portion of said aperture edges is in line contact with a corresponding portion of cylindrical contour of a corresponding centering stud, said portions of said aperture edges extending radially of the axis of the clutch.

5. An assembly according to claim 3, in which said centering studs are clamped solely to said cover member and pass through said diaphragm spring apertures transmitting minimal additional axial load to said cover member during operation.

6. An assembly according to claim 3, wherein said centering studs are rivetlike studs and each centering stud has a head bearing against one side of said cover member, an intermediate cylindrical shank portion received in a hole in said cover member and an enlarged end portion received in its associated aperture in said diaphragm spring.

7. An assembly according to claim 6, wherein said rivetlike centering studs are disposed along a circle with its center at the axis of the clutch between consecutive ones of said assembly means disposed substantially at the same radial distance from said clutch axis.

* * * * *